3,299,056
PREPARATION OF 3,3'-ETHYLENE BIS(TETRA-HYDRO-4,6-DIMETHYL 2H - 1,3,5-THIADIAZINE-2-THIONE)
Earl W. Cummins, Wilmington, Del., assignor to E. I. du Pont de Nemours and Company, Wilmington, Del., a corporation of Delaware
No Drawing. Filed Apr. 8, 1963, Ser. No. 271,461
3 Claims. (Cl. 260—243)

This application is a continuation-in-part of my copending application Serial No. 121,351, filed July 3, 1961 (U.S. Patent No. 3,085,046), which in turn is a continuation-in-part of my copending application Serial No. 809,597, filed April 29, 1959, and now abandoned, which in turn is a continuation-in-part of my application Serial No. 790,049, filed January 30, 1959, and now abandoned, which in turn is a continuation-in-part of my application Serial No. 713,314, filed February 5, 1958, and now abandoned.

This invention relates to the preparation of the compound 3,3'-ethylenebis(tetrahydro-4,6-dimethyl-2H-1,3,5-thiadiazine-2-thione). This compound is useful as a fungicide.

In the aforementioned applications, the reaction of (1) a salt of ammonia and a strong acid, (2) an aldehyde such as acetaldehyde, and (3) a salt of a bis-dithiocarbamic acid is described. This reaction is believed to involve invention.

The salt of ammonia and strong acid will be ammonium chloride, ammonium sulfate, ammonium acid sulfate, ammonium nitrate, ammonium formate, ammonium bromide, ammonium phosphate, ammonium acetate, or the like. The use of ammonium chloride is advantageous because for some reason not fully understood the use of this material results in higher yields of the desired product. Ammonium sulfate is highly preferred for its economic availability as well as its combination of chemical properties including non-corrosiveness which contributes to the overall efficiency of the process.

The dithiocarbamic acid salt will be the sodium salt (also called nabam), the potassium salt, the ammonium salt (also called ammobam), or a mixed sodium/ammonium salt of ethylenebisdithiocarbamic acid. The sodium salt (nabam) is preferred. Use of the ammonium salt or mixed salts is advantageous in that this tends to reduce markedly or even eleminate the amount of ammonium salt needed for the reaction.

For convenience, the process of this invention will now be described in greater detail by referring specifically by way of illustration to the reaction of ammonium sulfate, acetaldehyde and the disodium salt of ethylenebisdithiocarbamic acid (nabam).

In the present process, acetaldehyde is admixed with an aqueous solution of the ammonium sulfate, followed by admixture with the nabam.

Water is the preferred solvent for the reaction. Organic solvents such as acetone, dioxane, and other ketones and alcohols can also be used.

The overall ratio of total water in the process to the carbamic acid salt is found to have a significant effect on yield of the desired thiadiazinethione. This ratio will ordinarily be in the range from 750 to 5,000 and preferably from 2,000 to 3,000 grams of water per gram mole of carbamic acid salt. The water can be introduced if desired at three separate stages in the process: first, to dissolve the ammonium sulfate; second, with the acetaldehyde (for example, from a recovery recycle stream) unless anhydrous acetaldehyde is used; and third, with the nabam.

In a preferred process, ammonium sulfate is dissolved in water to form a 5 to 15% by weight solution. More or less water can of course be used at this stage.

The amount of ammonium sulfate used can vary by weight from less, even 10 or 15% less, than stoichiometric (based on the nabam) to as high as 300 or 400% or more of stoichiometric. No reason is seen to exceed 100% excess. From 15 to 50% excess is preferred because of the unexpectedly beneficial effect on yield.

The acetaldehyde, preferably aqueous but optionally anhydrous, is next gradually added to the ammonium sulfate solution. Excess acetaldehyde over stoichiometric (based on the nabam) improves product yield and is therefore preferred. From theoretical up to 100% or more excess acetaldehyde can be used. From 40–60% excess is preferred.

During reaction of the ammonium sulfate with the acetaldehyde, considerable heat evolves. Good agitation is helpful. The reaction temperature will generally be held below about the boiling point of acetaldehyde to preclude loss of acetaldehyde. Use of a pressure vessel or a condenser with cooling water at minus 10° C. or lower is convenient for maintaining desired reaction conditions.

Following the preceding reaction, easily observable by termination of the heat evolution, the nabam can be admixed with the reaction mass. Admixture can be immediate or after a considerable period, such as several days, as is convenient.

An aqueous solution of preferably about 10–40% by weight nabam is next admixed with the reaction mass from the preceding process step. Good stirring is recommended to avoid local heating and minimize excessive local concentration of reactants, as will be readily understood.

The precise rate of admixture will depend upon materials, batch size, equipment, stirring effectivenesses, cooling means, and other usual process conditions but will ordinarily be spread over a period of 15 minutes to about 24 hours, and preferably 30 minutes to 4 hours. Reaction temperatures of 30–50° C. are preferred. Lower temperatures surprisingly result in yield loss and poor product stability while higher temperatures cause undesired decomposition.

It is preferred to add the nabam last to facilitate heat removal. However, reverse order of addition is contemplated by the present invention and improved yields are noted using reverse order of addition.

The above order of addition of reactants is preferred but not essential for operability. The preferred order of addition of reactants effects a surprising increase in product stability.

From the preceding reaction, a precipitate is obtained of a good yield of finely divided 3,3'-ethylenebis(tetrahydro - 4,6-dimethyl-2H-1,3,5-thiadiazine-2-thione) product. This product is readily filtered off in excellent yields, even as high as 95 to 99% or more of pure product.

Under some conditions, the filter cake resulting from the process of this invention contains as much as 50% or more by weight of water and generally some acetaldehyde which may pose a fire problem. Surprisingly, the use of an excess of the starting ammonium salt reduces the amount of acetaldehyde in the filter cake with resulting improvement in safety.

Filtration can be by any conventional and convenient means such as by drum filter, filter press, or other means. The filtration can be under vacuum if desired. The filter cake can be dried further, if desired, as by tray or spray methods, or by extrusion into noodles or pellets for further dehydration as in a tunnel dryer or the like.

The filtrate can be treated to recover unreacted acetaldehyde which can be recycled into the process as described above if desired or to precipitate and recover out unreacted nabam using known techniques.

When the extrusion method is used, it is advantageous to admix with the reaction slurry, prior to filtering, from about 0.5 to about 3.5% by weight of a clay such as a swelling sodium montmorillonite which gives body and strength to the extrusions to prevent them from collapsing during the drying stage.

Note from the aforementioned applications that the desired product of this invention can be prepared by reacting acetaldehyde and the ammonium salt of ethylenebisthiocarbamic acid conveniently formed from ammonia, carbon disulfied and ethylenediamine.

The process of this invention using an ammonia salt differs from other processes disclosed in the aforementioned applications in that the use of ammonia which is a markedly weaker base than other amines and the use of acetaldehyde which is in a different class from formaldehyde presents problems and solutions to such problems which differ from expected and predicted chemical techniques, in order to obtain excellent yields and product of high quality and outstanding stability.

This invention will be better understood by reference to the following illustrative examples in which parts and percentages are by weight unless otherwise indicated.

Example 1

A 6.9% by weight solution of 123 parts by weight (15% excess) of ammonium chloride (2.3 moles) in 1660 milliliters of water is placed in a 5-liter round-bottom flask equipped with a thermometer, agitator, pressurized dropping funnel (to prevent acetaldehyde from boiling), and an ice-water cooled reflux condenser. The temperature of the solution is adjusted to 30° C. and 264 parts by weight (50% excess) of acetaldehyde (6.0 moles) is added through the dropping funnel during 15 minutes. The temperature increases spontaneously to 41° C. during this addition. The temperature is maintained at 40–44° C. by external cooling while 1165 parts of a 22% solution of the disodium salt of ethylenebisdithiocarbamic acid (1 gram mole) is added during 30 minutes. The reaction mass is maintained at 40–44° C. for an additional 30 minutes. The product is removed by filtration, washed with water and dried to constant weight in a circulating air oven at 85° C. to give 331 parts (94.8% of theory) of a pure white powder having a decomposition point of 147° C.

Example 2

Example 1 is repeated through the nabam reaction, following which 5.0 parts of bentonite is added to the mass. The solids are removed by filtration and the wet filter cake is conveyed to an extruder and extruded onto the bed of a conveyor dryer for drying at 85° C. The dried extruded particles are in excellent form and have high fungicidal activity.

Example 3

Example 1 is repeated except that the temperature is maintained at 50° C. during the final addition and the hold period. There is obtained 308 parts (88% of theory) of a pure white powder having a decomposition point of 148° C.

Example 4

Example 1 is repeated except that the temperature is maintained at 30° C. during the final addition and the hold period. There is obtained 320 parts (91.5% of theory) of a white powder having a decomposition point of 144° C.

Examples 5–13

The following Examples 5–13 are carried out using the procedure of Example 1 and using the following indicated quantities of reactants to obtain the indicated results:

| Example | Percent Excess Used | | | Product | | |
|---|---|---|---|---|---|---|
| | $NH_4Cl$ | $(NH_4)_2SO_4$ | Acetaldehyde | Parts | Percent Yield | Dec., °C. |
| 5 | 30 | | 50 | 340 | 97.2 | 148.5 |
| 6 | | 15 | 50 | 325 | 92.8 | 148.0 |
| 7 | | 30 | 50 | 331 | 94.8 | 149.0 |
| 8 | 0 | | 50 | 293 | 83.8 | 148.0 |
| 9 | | 0 | 50 | 293 | 83.8 | 148.5 |
| 10 | 0 | | 0 | 244 | 70.0 | 148.5 |
| 11 | | 0 | 0 | 236 | 67.6 | 147.0 |
| 12 | 0 | | 100 | 334 | 95.5 | 148.0 |
| 13 | 15 | | 0 | 259 | 74.0 | 148.0 |

Examples 14–17

The following Examples 14–17 are carried out using the procedure of Example 1 and varying the amount of water used to prepare the ammonium chloride solution as indicated:

| Example | Grams of $H_2O$ per Mole of Sodium Salt of Ethylenebisdithiocarbamic Acid | Product | |
|---|---|---|---|
| | | Percent Yield | Dec., °C. |
| 14 | 2,160 | 96.3 | 148.0 |
| 15 | 2,770 | 93.2 | 148.0 |
| 16 | 2,970 | 92.3 | 148.0 |
| 17 | 3,170 | 91.4 | 148.0 |

Examples 18–22

The following examples are carried out using the procedures of Example 1 and using the conditions and quantities of reactants employed in that example. The first addition takes 15 minutes and the second addition takes 30 minutes. The amount of water in the pot and in the final solution added is always equivalent to the amount in the ammonium chloride and nabam solutions, respectively, used in Example 1.

| Example | Added | To | Added | To | Percent Yield | Dec., °C. |
|---|---|---|---|---|---|---|
| 18 | $NH_4Cl$ | Nabam | Acetaldehyde | $NH_4Cl$, nabam | 94.3 | 146.0 |
| 19 | Acetaldehyde | do | $NH_4Cl$ | Acetaldehyde, nabam | 91.5 | 146.0 |
| 20 | do | $NH_4Cl$ | Acetaldehyde, $NH_4Cl$ | Nabam | 96.3 | 147.0 |
| 21 | $NH_4Cl$ | Nabam | $NH_4Cl$, nabam | Acetaldehyde | 95.3 | 144.5 |
| 22 | Acetaldehyde | do | Acetaldehyde, nabam | $NH_4Cl$ | 85.7 | 146.0 |

Example 23

The preceding Examples 1–22 are each repeated seven times substituting for the ammonium chloride of those examples corresponding amounts, respectively, of ammonium sulfate, ammonium acid sulfate, ammonium nitrate, ammonium formate, ammonium bromide, ammonium phosphate and ammonium acetate, with similarly satisfactory results.

*Example 24*

The preceding Examples 1–23 are each repeated twice substituting the corresponding potassium and ammonium carbamate respectively for the carbamates of those examples, with similarly satisfactory results.

The invention claimed is:
1. The process of making 3,3'-ethylenebis(tetrahydro-4,6-dimethyl-2H-1,3,5-thiadiazine-2-thione) which comprises reacting (1) an ammonium salt selected from the group consisting of ammonium chloride, sulfate, acid sulfate, nitrate, formate, bromide, phosphate, and acetate, (2) acetaldehyde and (3) a salt of ethylenebisdithiocarbamic acid selected from the group consisting of the sodium, potassium, ammonium, and mixed sodium/ammonium salts, in an aqueous medium, and at a temperature of from 30 to 50° C., said ammonium salt being used in an amount of from 15 to 50% excess, and the acetaldehyde being used in an amount of from 40 to 60% excess, both being based on the stoichiometric amount of the salt of ethylenebisdithiocarbamic acid, and recovering the 3,3'-ethylenebis(tetrahydro-4,6-dimethyl-2H-1,3,5-thiadiazine-2-thione) thus formed.

2. The process of claim 1 in which the ammonium salt is ammonium chloride and the salt of ethylenebisdithiocarbamic acid is the sodium salt.

3. The process of claim 1 in which the ammonium salt is ammonium sulfate and the salt of ethylenebisdithiocarbamic acid is the sodium salt.

References Cited by the Examiner

UNITED STATES PATENTS

| 2,838,389 | 6/1958 | Yoder | 260—243 XR |
| 3,126,378 | 3/1964 | Cummins | 260—243 |

FOREIGN PATENTS

| 570,205 | 8/1958 | Belgium. |
| 555,795 | 9/1943 | Great Britain. |

WALTER A. MODANCE, *Primary Examiner.*

NICHOLAS RIZZO, *Examiner.*

JOHN H. FORD, M. W. WESTERN,
*Assistant Examiners.*